United States Patent [19]

Torii

[11] Patent Number: 4,739,494
[45] Date of Patent: Apr. 19, 1988

[54] APPARATUS FOR MEASURING THE WEIGHT OF FUEL REMAINING IN A FUEL TANK ON A FLYING OBJECT

[75] Inventor: Makoto Torii, Tokyo, Japan

[73] Assignee: Japan Aircraft Development Corporation, Tokyo, Japan

[21] Appl. No.: 827,283

[22] Filed: Feb. 6, 1986

[30] Foreign Application Priority Data

Feb. 7, 1985 [JP] Japan .................................. 60-22366

[51] Int. Cl.⁴ ............................................. G01F 23/14
[52] U.S. Cl. .................................. 364/567; 364/558; 364/509; 73/301
[58] Field of Search ............... 364/558, 567, 564, 509; 73/1 H, 299, 301, 438

[56] References Cited

U.S. PATENT DOCUMENTS

| | | | |
|---|---|---|---|
| 3,640,134 | 2/1972 | Hop | 73/301 |
| 4,193,303 | 3/1980 | Egnell | 73/299 |
| 4,258,422 | 3/1981 | Dougherty et al. | 364/509 |
| 4,446,730 | 5/1984 | Smith | 73/301 |
| 4,494,210 | 1/1985 | Miller | 364/567 |
| 4,545,020 | 10/1985 | Brasfield | 364/509 |
| 4,553,216 | 11/1985 | Stevens et al. | 364/558 |

Primary Examiner—Gary Chin
Attorney, Agent, or Firm—Moonray Kojima

[57] ABSTRACT

An apparatus for measuring the remaining weight of fuel in a fuel tank on a flying object, comprising a first set of pressure transducers for detecting the level of fuel in the tank and its density and for outputting the corresponding pressure values; another pressure transducer for detecting the absolute pressure in the tank; and a processor unit connected to the respective transducers for receiving pressure information therefrom and for calculating the remaining weight of the fuel utilizing the pressure information and relevant data stored in a memory. The apparatus is substantially smaller in weight and less expensive than any conventionally known apparatus, and has a high degree of accuracy and reliability of performance.

5 Claims, 6 Drawing Sheets

4,739,494

APPARATUS FOR MEASURING THE WEIGHT OF FUEL REMAINING IN A FUEL TANK ON A FLYING OBJECT

BACKGROUND OF THE INVENTION.

1. Field of Invention

This invention relates to an apparatus for measuring the remaining weight of fuel in a fuel tank on a flying object; and more particularly, to such an apparatus wherein transducers are utilized to provide information which is processed by a processor to generate a signal relating to the weight.

2. Description of Prior Art

A known apparatus for measuring the remaining weight of fuel in a fuel tank on a flying object, such as described in U.S. Pat. No. 4,281,542, comprises a plurality of electrostatic capacity type liquid level gauges, wherein the electrostatic capacity which is outputted by each level gauge is proportional to the level of fuel and its electrostatic coefficient.

FIG. 1 is a block diagram depicting a known apparatus, comprising a plurality of electrostatic capacity type transducers, which act as the liquid level gauges 3, disposed in a fuel tank 1, provided on a flying object, e.g. in a main wing of an aircraft, for holding fuel 2. The plurality of gauges 3 are distributed over the entire inside area of the fuel tank 1, as depicted, for the purposes of measuring the levels $\delta_l \ldots \delta_n$ of fuel at various parts of fuel tank 1. A compensator unit 4 is provided for compensating the electrostatic coefficient K of fuel 2. A density meter 5 is provided for measuring the density $\rho$ of fuel 2. A processor unit 6 is suitably configured for fuel tank 1 and comprises a memory 7, for storing information including the fuel level (l)—volume (V) characteristic shown in FIG. 2, and the values as measured; an electrostatic capacity input interface 8, which is connected to gauges 3 and compensator unit 4; a frequency input interface 9, which is connected to density meter 5; an input/output interface 10 to which values, such as the total weight of the flying object and the weight of the fuel to be supplied, are inputted, and from which the results of calculation by calculation function unit 12, are outputted; and calculation function unit 12 which receives data and inputted values from memory 7 through a data bus 11, and performs the necessary calculations based on such data and values. Units 7,8,9,10,12 are connected to data bus 11 as depicted.

Electrostatic capacity input interface 8 receives the output of level gauges 3 (electrostatic capacity values $Q_l$ to $Q_n$) which are proportional to levels $\delta_l \ldots =_n$ of fuel 2, respectively, at various points in fuel tank 1, and the output of compensator unit 4 for correcting electrostatic coefficient K of fuel 2. The calculation function unit 12 calculates corrected fuel levels $l_{11} \ldots l_{n1}$ by correcting the effect of the electrostatic coefficient K of the on the electrostatic capacity values $Q_l$ to $Q_n$, respectively, the volume V corresponding to the corrected fuel levels $l_{l1} \ldots l_{n1}$, respectively, in accordance with the fuel level-volume characteristic adapted for the shape of the fuel tank 1 and stored in memory 7.

If the flying object has tilted (e.g. rolled), the height H of immersion and the angle $\alpha$ of inclination of the fuel surface are calculated from the values detected by, for example, two of level gauges 3. A curve showing the fuel level-angle-volume characteristic is priorly obtained from the angle $\alpha$ and the fuel level-volume characteristics and entered into the memory 7. This curve has a shape depending on the shape of the fuel tank and shows the relationship between the level l of fuel above a particular point of the bottom of a particular fuel tank, the angle $\alpha$ of inclination and the volume V of the fuel. The volume V is obtained by calculation function unit 12 from the curve and multiplied by the density $\rho$, as measured by the density meter 5, whereby the remaining weight W of the fuel is determined by the equation $W = \rho \times V$.

The apparatus has many deficiencies and disadvantages, such as, for example, since the known apparatus requires a plurality of electrostatic capacity type level gauges, a plurality of coaxial cable or shielded wires are needed for connecting the processor to the individual electrostatic devices. Disadvantageously, such coaxial cables or shielded wires are expensive, and are of substantial weight, especially, where the fuel tanks are a distance from the processor, the weight may be considerable. Furthermore, the electrostatic devices have low resistance to vibration and are moreover difficult to repair and maintain.

Thus, in the art, there is a need for a simpler, accurate and reliable and also more inexpensive, apparatus for measuring the weight of fuel remaining in a tank on a flying object.

SUMMARY OF THE INVENTION

Accordingly, it is an object of the invention to overcome the aforementioned and other deficiencies and disadvantages of the prior art.

Another object is to provide an apparatus which is simple in construction, is inexpensive, and is at least comparable to or better than known apparatus as to measuring capacity, accuracy and reliability.

A further object is to provide an apparatus which utilizes pressure transducers for the detection of the level of fuel and for the detection of the internal pressure of a tank, instead of utlizing conventional electrostatic capacity type liquid level gauges and compensator unit.

A still further object is to provide such a measuring apparatus which reduces the total weight of the wiring connecting the detectors to a processing unit, and which can accurately measure the remaining fuel weight even during the balanced swinging, transverse acceleration, or forward acceleration of the flying object, such as an aircraft.

A yet further object is to provide an apparatus which utilizes only pressure transducers as sensors in the fuel tank to eliminate the effects of acceleration on signal processing, so that the level of fuel and the angle of inclination of the fuel surface can be readily determined without requiring correction for acceleration.

Another further object is to provide an inexpensive apparatus of high accuracy, reliability and performance, which requires only a small number of simple pressure transducers and which is light in total weight, is highly resistant to vibration, and is easy to inspect and repair.

The foregoing and other objects are attained by the invention, which encompasses an apparatus comprising a plurality of first pressure transducers provided at different points in a fuel tank on a flying object, such as an aircraft, for detecting the levels of fuel in the fuel tank at those different points; a second pressure transducer associated with at least one of the plurality of first pressure transducers, for detecting the level of fuel required as information for the calculation of the density of the fuel; a third pressure transducer for detecting the internal pressure of the fuel tank; and a processing unit connected to the first second and third pressure transducers, for calculating the remaining weight of the fuel in the tank. The second pressure transducer is located at a certain distance directly above at least one of the plurality of first pressure transducers. The pressure transducers are simple in construction. Only a small number of pressure transducers are required for the measuring of the remaining fuel weight. The apparatus is thus drastically smaller in weight than any known apparatus. It is also substantially less expensive and yet has a higher degree of accuracy and reliability of performance. Moreover, the pressure transducers used herein are highly resistant to vibration, and are easy to inspect and maintain.

DETAILED DESCRIPTION OF PREFERRED EMBODIMENTS

Figure 1:
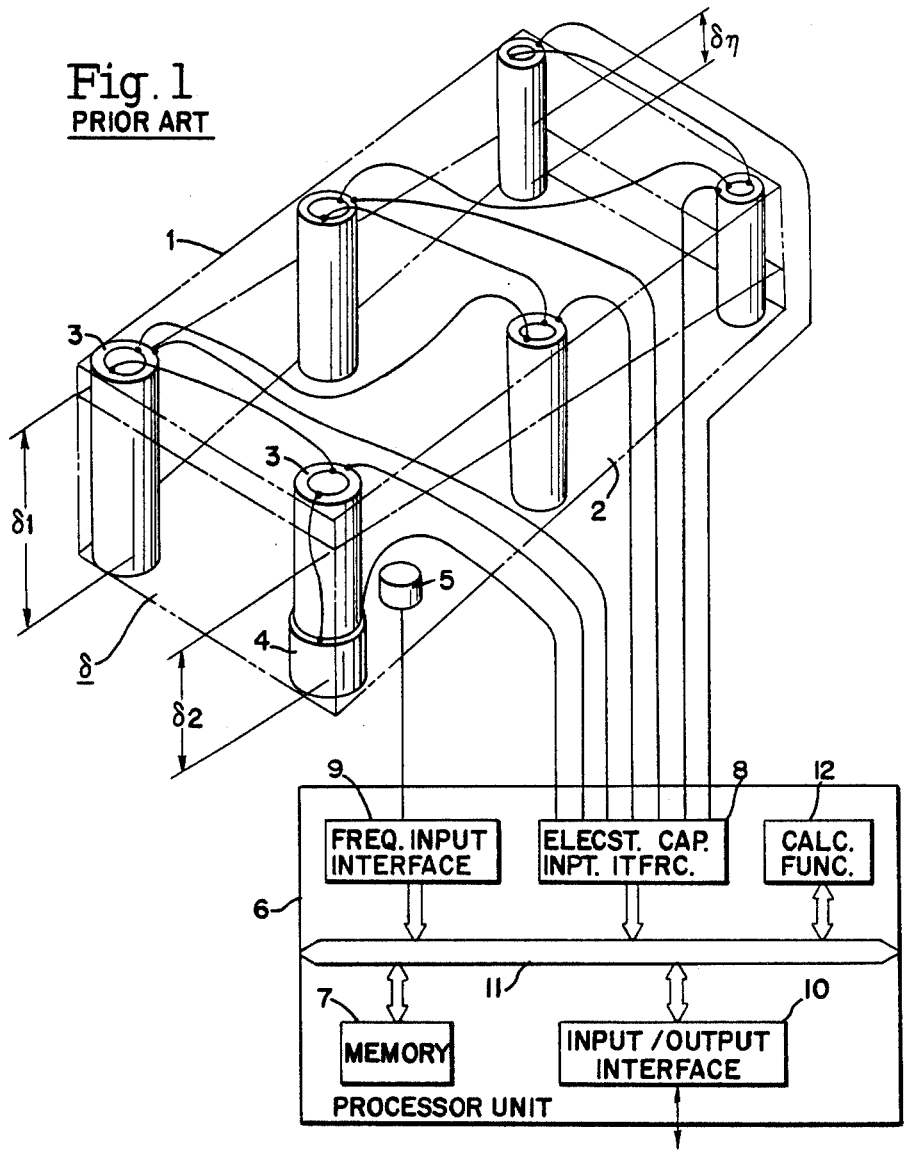
FIG. 1 is a block diagram depicting a known apparatus for measuring the remaining fuel weight on a flying object.
Figure 2:
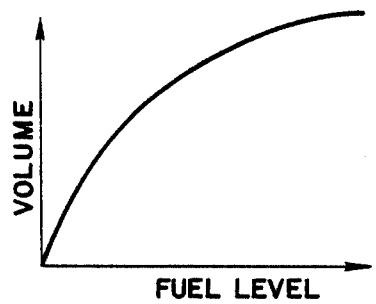
FIG. 2 is a graph depicting the relation of volumne and fuel level as pertains to the apparatus of FIG. 1.
Figure 3:
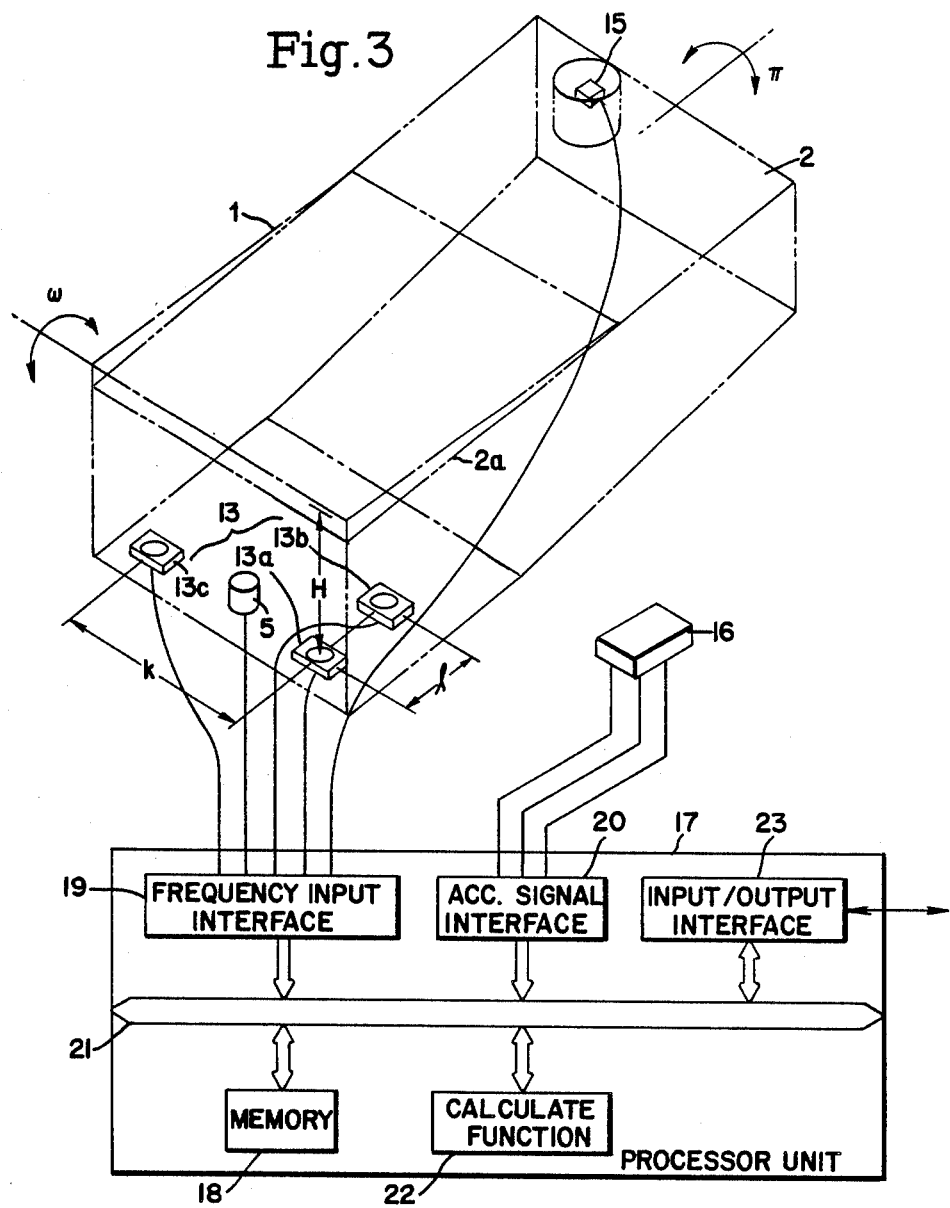
FIG. 3 is a block diagram depicting an illustrative embodiment of the invention.

In FIG. 3, the measuring apparatus comprises three pressure transducers 13 (also labelled 13a,13b,13c) which are provided on the bottom of a fuel tank 1, for determining the level or height H of fuel 2 in tank 1 as pressure $P_F$. Although three pressure transducers are shown, more may be used as desired. Each of the pressure transducers 13a, 13b,13c is a sensor which detects the absolute pressure of fuel 2 and outputs a corresponding frequency signal. The fuel level detectors 13a, 13b, 13c are spaced apart from each other transversely by a distance k and also longitudinally by a distance l in order to determine the angle $\phi$ and $\theta$ of inclioi of the fuel surface when the flying object is tilted transversely (e.g. rolling) or tilted longitudinally (e.g. pitching). Another pressure transducer 15 is provided from measuring the absolute pressure $P_o$ inside fuel tank 1. It is not in contact with fuel 2. Fuel tank 1, on a flying object, usually has an excess pressure of about 3 psi (about 0.2 kg/cm$^2$).

An acceleration meter 16 is provided for measuring the acceleration g of the flying object and for correcting the fuel measurement from acceleration effects. A processor unit 17 is connected to fuel level detectors 13, fuel density meter 5, internal pressure detector 15 and acceleration meter 16 for calculating the weight of the remaining fuel in tank 1, from the results of measurements by these instruments. Processor 17 comprises frequency input interface 19, accelerator signal interface 20, input/output interface 23, memory 18 and calculation function unit 22, all interconnected to data bus 21. Memory 18 stores information, such as fuel level, inclination angle and volume characteristics which are suitable for the shape of the fuel tank 1, and the results of the measurements. Frequency input interface 19 is connected to fuel level detectors 13, density meter 5 and internal pressure detector 15. Acceleration signal interface 20 is connected to acceleration meter 16. Input/output interface 23 receives information, such as the amount of fuel to be supplied, and outputs the results of the calculations by unit 22. Calculation function unit 22 receives the above information from the memory, and units 19 and 20, and the information from interface 23, through data bus 21, and performs the necessary calculations.

The pressure P measured by each of the fuel level detectors 13a, 13b, 13c is expressed by the following equation $$P = \rho \cdot g \cdot H + P_o \qquad (1)$$

wherein g is acceleration, $P_o$ is absolute pressure and $\rho$ is the density.

The fuel level H is thus expressed by the following $$H = (P - P_o)/\rho \cdot g \qquad (2)$$

The volume V is expressed as a function of the fuel level H $$V = F(H) \qquad (3)$$

If the fuel surface, for example, is inclined as shown at 2a, the fuel level H and the angle $\alpha$ of inclination of the fuel surface are calculated by fuel level detector 13a (or 13b) and the fuel level detector 13c which are spaced apart by distance k. Fuel volume V is obtained by unit 14 from the fuel level, angle and volume characteristics which are previously stored in the memory 18 and the remaining fuel weight W is calculated by unit 22 from the equation W=$\rho \cdot$V, wherein $\rho$ is density.

If the fuel surface is inclined as shown at 2a, the fuel level H and angle $\alpha$ of inclination of the fuel surface are calculated by the fuel level detector 13a (or 13c) and the fuel level detector 13b which is spaced apart therefrom by distance l. The fuel volume V is obtained by unit 17 from the fuel level, angle and volume characteristics previously stored in memory 18 and the remaining fuel weight W is calculated by unit 22 from the equation W=$\rho \cdot$V.

The apparatus of FIG. 3 is smaller in weight than the conventional apparatus, since each of the fuel level detectors and the internal pressure detector comprises a pressure transducer. However, this embodiment uses separate acceleration meter and density meter which have characteristics which can be improved upon. For example, the fuel on a flying object may change in density. Density meter 5 usually measures the density at a fixed point, and usually not an average density, such as when the density changes. This can affect the degree of absolute accuracy. Also, any error made by the acceleration meter would lead to errors in the measurement of the weight of the remaining fuel. Moreover, a change in acceleration would lead to a problem when there is a time difference between measurement of pressure and measurement of acceleration.

Figure 4:
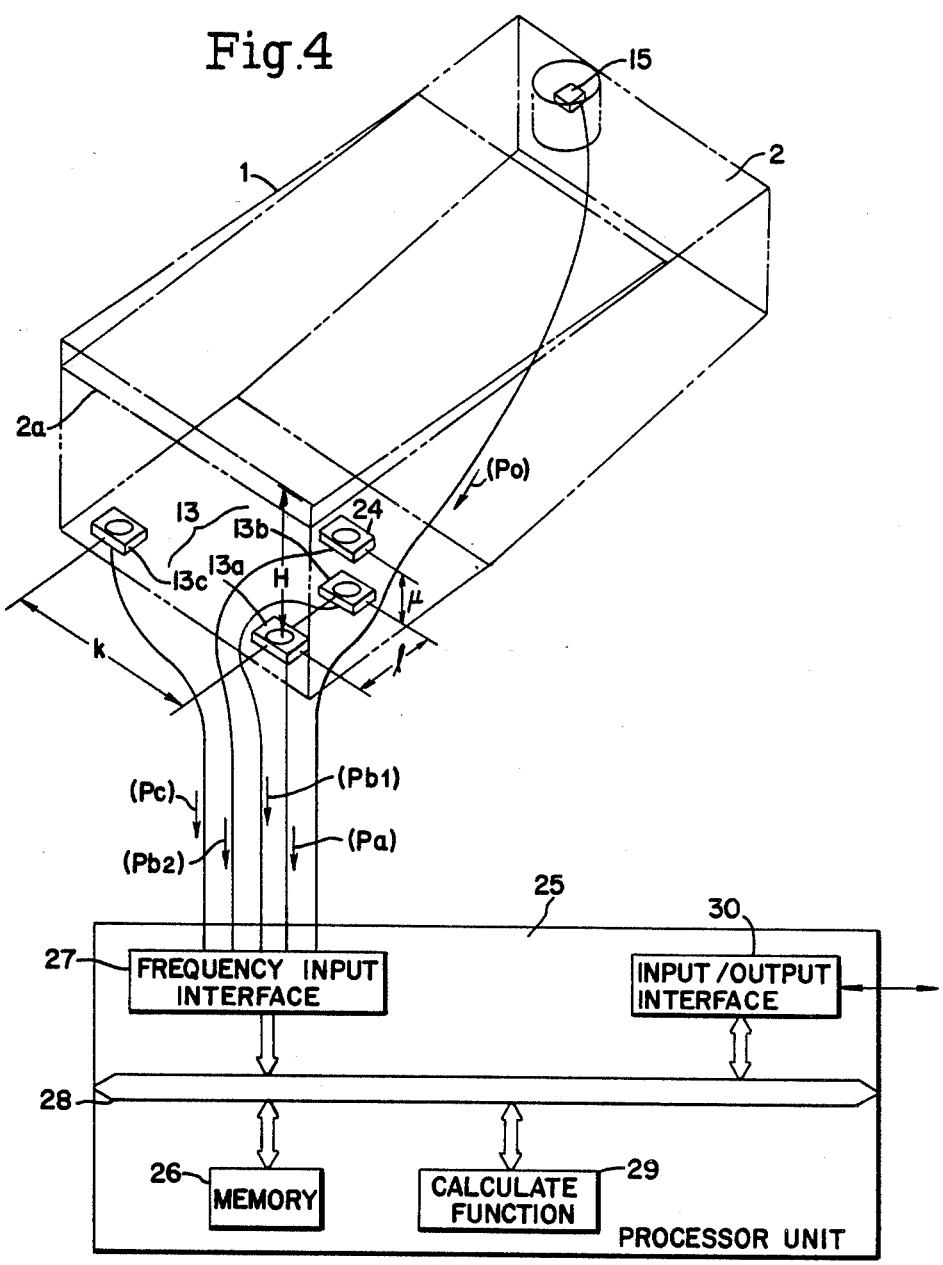
FIG. 4 is a block diagram depicting another illustrative embodiment of the invention.

In another illustrative embodiment, depicted in FIG. 4, the density sensor and acceleration sensor have been eliminated, and only a plurality of pressure transducers are utilized. Thus, with the FIG. 4 embodiment, the acceleration of the flying object does not have any effect on the signal processing, and consequently highly accurate measurement of the weight of the remaining fuel is obtained without being affected by acceleration. In the embodiment the fuel level and angle of inclination of the fuel surface are determined without requiring any correctinn based on acceleration signal. Also, the density is handled without requiring any/separate density meter.

Figure 5:
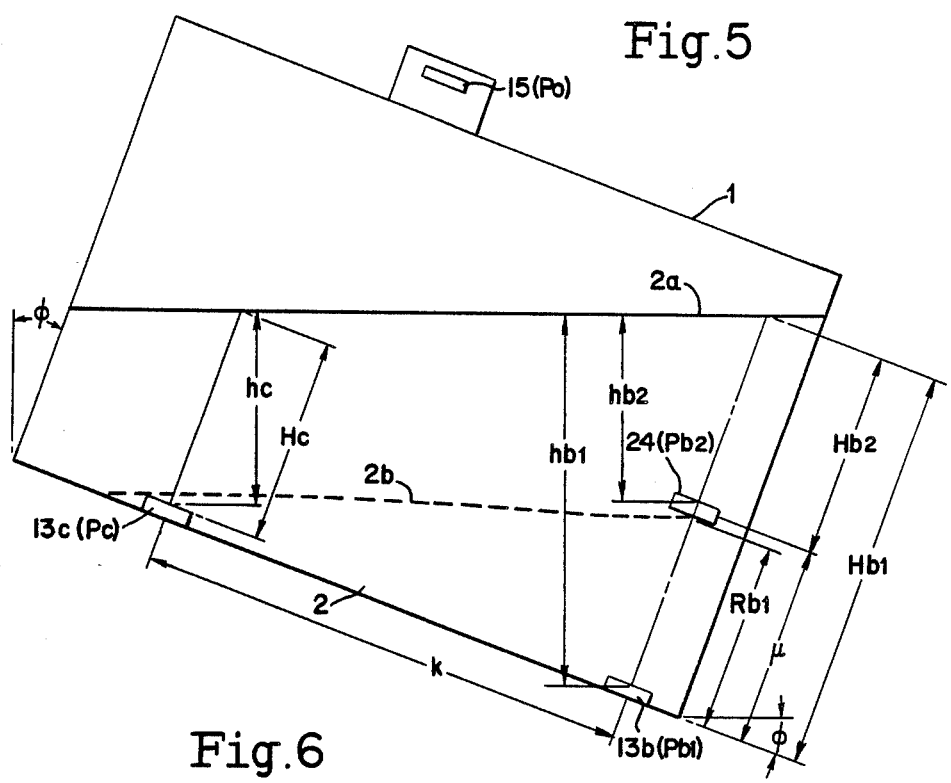
FIG. 5. is a front elevation view (as seen from the left of FIG. 4) for explaining the operation of the embodiment of FIG. 4.
Figure 6:
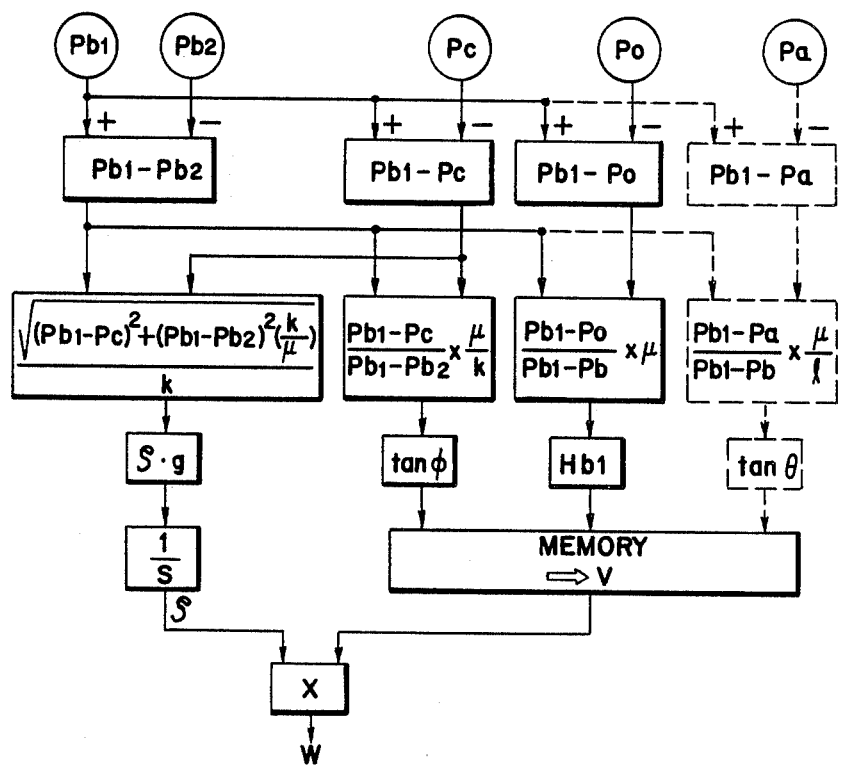
FIG. 6 is a flow chart depicting the calculations performed by the embodiment of FIG. 4.

The illustrative embodiment depicted in FIGS. 4,5,6 include a number of parts which have the same reference number as in FIG. 3. These parts are not further discussed hereat for sake of simplifying description.

The apparatus of FIG. 4 includes an auxiliary fuel level detector 24, which comprises a pressure transducer. It is associated with at least one of the fuel level detectors 13a, 13b, 13c. More specifically, it is located in fuel 2 at a certain distance $\mu$ substantially directly above fuel level detector 13b. A processor unit 25 is connected to fuel level detectors 13a, 13b, 13c, auxiliary fuel level detector 24 and internal pressure detector 15, and operates to calculate the remaining fuel weight W from the results of measurements by those instruments, and utilizing data from memory 26. The processor unit 25 comprises memory 26, for storing the fuel level, inclination angle and fuel volume characteristics which are suitable for the shape of the fuel tank 1, and the information required for the calculation of the remaining fuel ght; a frequency input interface 27, connected to fuel level dectectors 13a, 13b, 13c, auxiliary fuel level detector 24 and internal pressure detector 15; an input/output interface 30 which receives information, such as the amount of fuel to be supplied, and outputs the results of calculations by unit 29; and a calculation function unit 29, which receives information from memory 26 and interfaces 27,30 through a bus 28 and performs the necessary calculations. The various units 27,26,29,30 are connected to the data bus 28, as depicted.

When the flying object moves, it may pitch and/or roll. Thus, it is necessary to incorporate corrections based on the angle of inclination of the fuel surface (i.e. the angle of pitch or roll) in order to determine accurately the remaining fuel weight W.

FIG. 5 shows the position when fuel tank 1/is tilted such as by an angle $\phi$ when the flying object rolls. The weight of the remaining fuel W in tank 1 is calculated by unit 29 by correcting the outputs of fuel level detectors 13a, 13b, 13c, the outputs of auxiliary dectector 24 and the outputs of internal pressure detector 15, in accordance with the angle of rolling.

If the fuel level detectors 13b and 13c work to detect pressures $P_{b1}$ and $P_c$, respectively, equation (1) can be rewritten as $$P_{b1} = \rho \cdot g \cdot H_{b1} \cos \phi + P_o = \rho \cdot g \cdot h_{b1} + P_o \qquad (4)$$

$$P_c = \rho \cdot g \cdot H_c \cos \phi + P_o = \rho \cdot g \cdot h_c + P_o \qquad (5)$$

wherein $h_{b1}$ and $h_c$ are the heights above the fuel level detectors 13b and 13c, respectively, as measured perpendicularly to the fuel surface 2a. They have the following relationship $$h_c = h_{b1} - k \sin \phi \qquad (6)$$

The pressure $P_{b2}$ detected by auxiliary fuel level detector 24 is expresed by the following $$P_{b2} = \rho \cdot g \cdot h_{b2} \cos \phi + P_o \qquad (7)$$

$$= \rho \cdot g(h_{b1} - \mu \cos \phi) + P_o$$

$$= \rho \cdot g \cdot h_{b2} + P_o$$

wherein $h_{b2}$ is the height above auxiliary detector 24 as measured perpendicularly to the fuel surface 2a.

The angle $\phi$ of inclination of the fuel surface is calculated as follows

Equations (4) to (6) give the following equation $$P_{b1} - P_c = \rho \cdot g \cdot k \sin \phi \qquad (8)$$

Equations (4) and (7) give the following equation $$P_{b1} - P_{b2} = \rho \cdot g \cdot \mu \cos \phi \qquad (9)$$

Equations (8) and (9) give the following $$(P_{b1} - P_c)/(P_{b1} - P_{b2}) = (k/\mu) \tan \phi$$

Thus, $$\tan \phi = (\mu/k) \cdot [(P_{b1} - P_c)/(P_{b1} - P_{b2})] \qquad (10)$$

This value is satisfactory for a civil aircraft since a pitch angle of $\pm 10°$ and a roll angle of $\pm 3°$ are usually acceptable.

Then, height $H_{b1}$ is calculated. Equation (4) is modified to give the following $$(P_{b1} - P_o)/h_{b1} = \rho \cdot g \qquad (11)$$

wherein $h_{b1} = H_{b1} \cos \phi$. This equation is substituted into equation (8) to give the following $$P_{b1} - P_c = k \tan \phi \cdot [(P_{b1} - P_o)/H_{b1}] \qquad (12)$$

This equation is then substituted into equation (10) to give the following $$P_{b1} - P_c = \mu (P_{b1} - P_o)(P_{b1} - P_c)/(P_{b1} - P_{b2}) H_{b1} \qquad (13)$$

Thus, height $H_{b1}$ is expressed by the following $$H_{b1} = \mu (P_{b1} - P_o)/P_{b1} - P_{b2}) \qquad (14)$$

Fuel volume V can be obtained from the angle of inclination of the fuel surface and height $H_{b1}$.

Then, density $\rho$ of the fuel is calculated. Equation (8) is modified to give the following $$\sin \phi = (P_{b1} - P_c)/\rho g k \qquad (15)$$

Equation (9) is modified to give the following $$\cos \phi = (P_{b1} - P_{b2})/\rho g k \qquad (16)$$

Equations (15) and (16) give the following equation (17)

$$(\sin \phi)^2 + (\cos \phi)^2 = [(P_{b1} - P_c)^2 + (P_{b1} - P_{b2})^2 (k/\mu)^2]/(\rho g k)^2 = 1$$

Since density ρ has a smaller ratio of change than acceleration g, g can be deemed as being equal to 1 if signal processing is carried out by removing the component of the acceleration g through, for example, a low pass filter. Thus, equation (17) can be rewritten as follows $$(\sin\phi)^2 + (\cos\phi)^2 = [(P_{b1}-P_c)^2+(P_{b1}-P_{b2})^2(k/\mu)^2]/k \qquad (18)$$

A signal representing the acceleration g can be used for obtaining the density if one is easily available from another source, or if any acceleration signal is used as an input to another instrument. Even if an acceleration signal may be inputted from an external source, however, there does not occur any large error due to density since it has a large time constant of change.

Volume V of fuel can be obtained from the memory 26 which stores the results of the calculation made in accordance with the following $$V = f(H_{b1})f(H_{b1})f(H_{b1}) \qquad (19)$$

Thus, the weight W of the remaining fuel can be obtained by $W = \rho \cdot V$.

FIG. 6 is a flow chart which summarizes the above calculations.

Referring again to FIG. 5, fuel level detectors 13a and 13b are located on a common axis of rolling. Similar results can be obtained even if they are located on different axis of rolling, e.g. even if the fuel level detectors 13a, 13b, 13c are not located on any axis of rolling or pitching, i.e. when the fuel level detectors 13a and 13b detect pressures $P_a$ and $P_{b1}$, respectively, while the auxiliary detector 24 detects pressure $P_{b2}$.

Although the foregoing description was with reference to the roll angle φ, the same method of calculatinn is applicable to pitch angle θ if the distance l is used instead of k (see FIG. 4) The broken lines in FIG. 6 show the calculations made for obtaining tan θ by using pressures $P_a$, $P_{b1}$ and $P_{b2}$ detected by fuel level detectors 13a, 13b, 13c, respectively.

In FIG. 4, auxiliary detector 24 is provided above detector 13b. It is equally possible to located one auxiliary detector above either detector 13a or 13c. It is also possible to locate an auxiliary detector above each of detectors 13a, 13b, 13c. This modified arrangment enables the apparatus be be more reliable since there would then be a redundancy of detectors.

From consideration of equations (1) through (19), it can be understood that even if one of the detectors 13a, 13b, 13c should fail, it is possible to still determine the remaining fuel weight, since the remaining two detectors permit the calculation of the angle of roll and/or pitch.

If the level of the fuel in tank 1 drops to a level $R_{b1}$ below the auxiliary detector 24, as shown by broken line 2b in FIG. 5, however, the calculations above described would not be useful since none of the equations containing μ, such as (9), (10) (13), (14), (16), (17) and (18) would hold. There are two possible solutions.

Figure 7A:
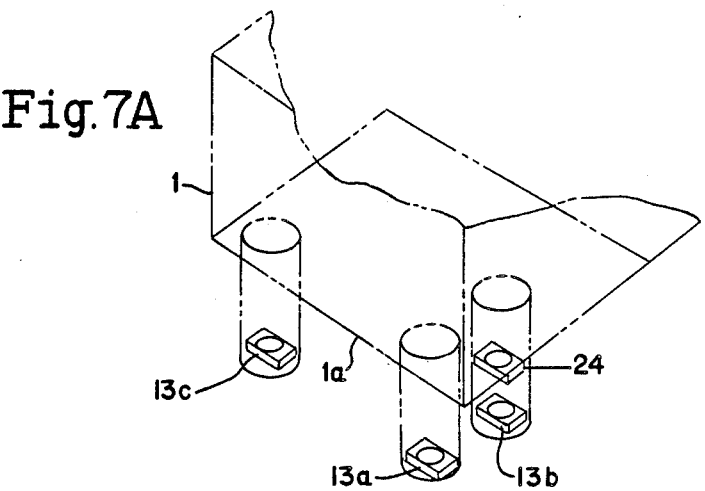
FIG. 7A is a partial cutaway perspective view depicting a still further embodiment of the invention.
Figure 7B:
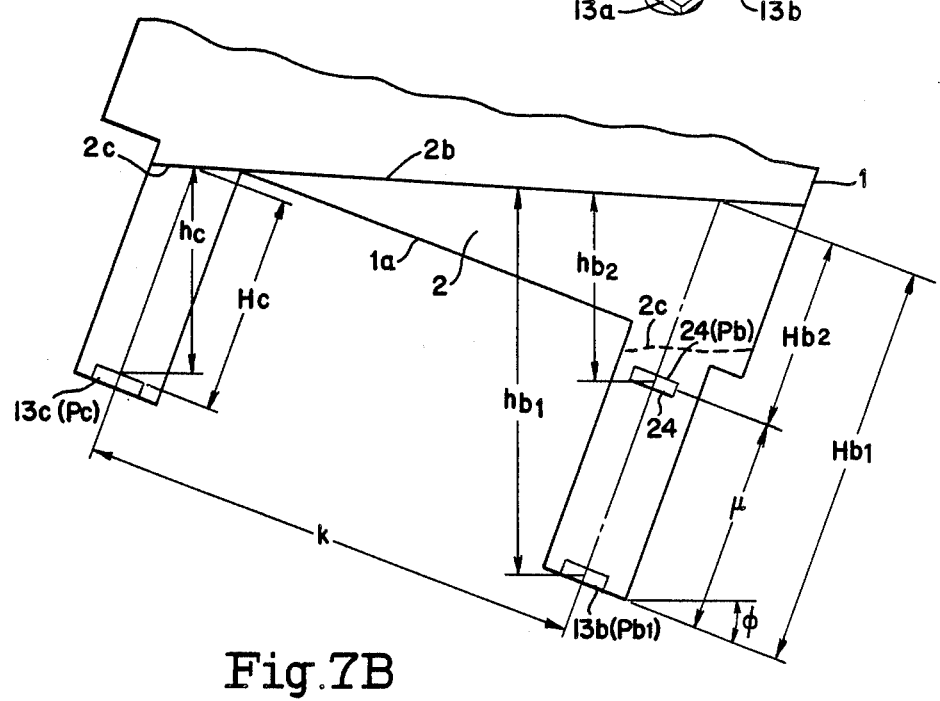
FIG. 7B is a diagram explaining the operation of the embodiment of FIG. 7A.

One solution is to alter the position of the fuel level detectors, such as shown in FIGS. 7A, 7B. In FIG. 7A, detectors 13a, 13b, and 13c are located below the bottom 1a of tank 1. This arrangement enables the accurate determination of even the minimum remaining fuel weight, except when fuel 2 has a surface such as shown by broken line 2c, as is apparent from a study of FIG. 7B. Thus, the remaining fuel weight W can be calculated accurately using equations (1) to (19).

Figure 8:
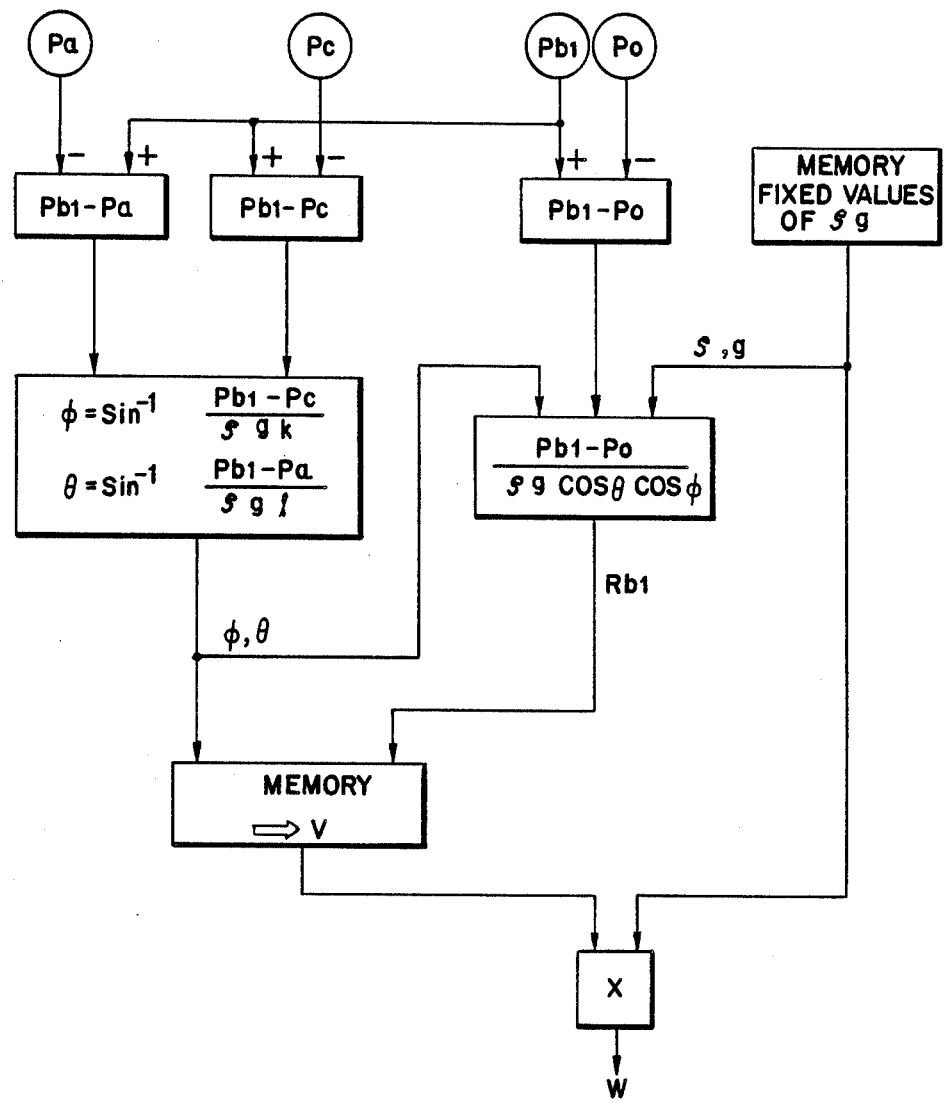
FIG. 8 is a flow chart depicting the calculations performed by the embodiment of FIG. 7A.

The other solution, as shown in the flow chart of FIG. 8, uses a flow of calculations by a processor unit, instead of relying on equations (1) to (19). This solution enables the approximate determination of the remaining fuel weight.

Since pressures $P_a$ and $P_{b1}$ are detected by fuel level detectors 13a and 13b, respectively, equation (8) gives the following $$P_{b1}-P_a = \rho \cdot g \cdot \sin\phi \qquad (20)$$

Since no calculation provides the values of ρ and g when the fuel is at level $R_{b1}$, though g can be deemed as being equal to 1, as hereinbefore stated with reference to equation (18), the values of ρ and g are fixed when the fuel has dropped to level μ. Insofar as only a small amount of fuel remains, no change of density or acceleration is likely to have any substantial effect on the determination of the remaining fuel weight. According to equations (8) and (20), the roll and pitch angles are as follows $$\phi = \sin^{-1} \cdot [(P_{b1}-P_c)/\rho gk] \qquad (21)$$

$$\theta = \sin^{-1} \cdot [(P_{b1}-P_a)/\rho gk] \qquad (22)$$

Therefore, level $R_{b1}$ of fuel, which prevails when the flying object has rolled an angle φ, as shown in FIG. 5, can be calculated from equation (23), as a level of fuel higher than μ can be obtained from equation (11)

$$R_{b1} = (P_{b1}-P_o)/\rho g \cos\phi \qquad (23)$$

In a like manner, the fuel level $P_{b1}$, prevailing when the flying obJect has pitched an angle θ, can be obtained from the following equation $$R_{b1} = (P_{b1}-P_o)/\rho g \cos\phi \qquad (24)$$

The level $R_{b1}$, prevailing when the flying object has rolled and pitched, can in a like manner be obtained from the following $$R_{b1} = (P_{b1}-P_o)/\rho g \cos\phi \cdot \cos\theta \qquad (25)$$

Thus, volume V of the fuel can be calculated from the following equation, based on equation (19)

$$V = F(R_{b1},,) \qquad (26)$$

The weight of the remaining fuel can be calculated from the fixed values of density ρ and of acceleration g, and volume. Thus, weight $W = V \cdot \rho g$. If the value of g greatly deviates from 1, there also occurs a change in the value of the remaining weight W. In such event, however, the pilot realizing that only a small amount of fuel remains would not be overly concerned even though the value of g is varying since the apparatus would continue to approximate the remaining fuel weight, in a manner that error would be only slight.

The foregoing description is illustrative of the principles of the invention. Numerous modifications and extensions thereof would be apparent to the worker in the art. All such modifications and extensions are to be considered to be within the spirit and scope of the invention.

What is claimed is:

1. An apparatus for measuring weight of fuel remaining in a fuel tank on a flying object, said tank having an excess pressure, said apparatus comprising three fuel level detectors (13a, 13b, 13c) comprising three absolute pressure measuring transducers of a type outputting a pressure in a form of a frequency signal, said pressure transducers being immersed in said fuel to detect fuel level, and said pressure transducers being provided on the bottom of said fuel tank at predetermined distances from each other in the same plane (k,l) so as to calculate an angle of inclination of fuel surface, fuel level and density while cancelling the component of acceleration included in a detected value outputted from each of said pressure transducers;

an auxiliary fuel level detector (24) comprising at least one pressure transducer positioned at a predetermined distance ($\mu$) substantially directly above at least one of said fuel level detectors and within said fuel tank;

an internal pressure detector (15) comprising an absolute pressure measuring transducer of a type outputting an internal pressure value in a form of a frequency signal, said internal pressure transducer being disposed within said fuel tank alone at a position which is out of contact with said fuel to measure internal pressure of said fuel tank which is in an excess pressure state as an absolute pressure value, said measured internal pressure being provided to eliminate a detected pressure value of said fuel tank in an excess pressure state which is included in the detected values outputted from said fuel level detectors and said auxiliary fuel level detectors; and a processor unit connected to said fuel level detectors, said auxiliary fuel level detector and said internal pressure detector, and comprising a memory (26) for storing information concerning predetermined fuel level, predetermined inclination angle and predetermined volume characteristics matched with the shape of said fuel tank and calculated information required to calculate weight of remaining fuel, a frequency input interface (27) supplied with outputs from said fuel level detectors, said auxiliary fuel level detector and said internal pressure detector, a calculation function circuit (29) for calculating angle of inclination of fuel surface and fuel level in a form wherein the component of acceleration included in each measured pressure value is cancelled by dividing the pressure values outputted from said fuel level detectors by the pressure values outputted from said auxiliary fuel level detectors, on basis of information inputted to said frequency input interface and information stored in said memory, for obtaining volume of fuel from said stored information concerning predetermined fuel level, predetermined inclination angle and predetermined volume characteristics, for calculating density of fuel on basis of pressure values outputted from said auxiliary fuel level detector and one of said fuel level detectors disposed vertically opposite thereto, pressure values outputted from two of said three fuel level detectors and values relating to distances between said three fuel level detectors, and for obtaining a weight of remaining fuel by multiplying together said fuel volume and said fuel density, and an output interface (30) for outputting the results of calculation performed by said calculation function circuit.

2. The apparatus of claim 1, wherein by use of output values of said fuel level detectors, said auxiliary fuel level detector, and said internal pressure detector, and distances (k and l) between said three fuel level detectors, distance ($\mu$) between said auxiliary fuel level detector and a fuel level detector disposed opposite thereto, stored information concerning predetermined fuel level, predetermined inclination angle and predetermined volume characteristics matched with shape of said fuel tank, and calculated information required to calculate weight of remaining fuel, which are previously stored in said memory, said processing unit first subtracts the pressure value of one of said fuel level detectors from the pressure value of another of said fuel level detectors and second subtracts the pressure value of said auxiliary fuel level detector from the pressure value of the other fuel level detector, divides the result of the first subtraction by the result of the second subtraction, and multiplies the result of the division by said distance values between said fuel level detectors, thereby obtaining an angle of inclination of fuel surface in the form wherein component of acceleration included in the pressure value outputted from each of the said detectors is cancelled, third subtracts the pressure value of said internal pressure detector from the pressure value of said other fuel level detector, and fourth subtracts the pressure value from the auxiliary fuel level detector from the pressure value of the other fuel level detector, divides the result of said third subtraction by the result of said fourth subtraction and multiplies the result of said division by said distance value between said auxiliary fuel level detector and fuel level detector disposed opposite thereto, thereby obtained a fuel level in a form wherein component of acceleration included in the pressure value outputted from each of said pressure transducers is cancelled, obtains a volume of fuel from said calculated angle of inclination of fuel surface and fuel level and by use of said information concerning predetermined fuel level, predetermined inclination angle and predetermined volume characteristics previously stored in said memory, calculates a density of fuel by the use of values obtained by subtracting the pressure value of said one fuel level detector from the pressure value of the other fuel level detector, subtracting the pressure value from the auxiliary fuel level detector from the pressure value of the other fuel level detector and said distances between said fuel detectors, and multiplies together said fuel volume and said fuel density to obtain weight of remaining fuel.

3. The apparatus of claim 1, wherein, when the level of said fuel is lower than the position of said auxiliary fuel level detector, said processor unit stores said fuel density calculated immediately before the fuel level becomes lower than said position of the auxiliary fuel level detector, and by use of output values from said fuel level detectors and said internal pressure detector and information stored in said memory, subtracts the pressure value outputted from a third fuel level detector from the pressure value of the other fuel level detector, and calculates an angle of inclination of fuel surface by use of the result of said subtraction, said distance values between said fuel detectors, and said stored fuel density, calculates fuel level by use of said angle of inclination of fuel surface, value obtained by subtracting the pressure value outputted from said internal pressure detector from the pressure value from the other fuel level detector, and said stored fuel density, obtains volume of fuel from said angle of inclination of fuel surface and said fuel level and by use of said information concerning predetermined fuel level, predetermined inclination angle and predetermined volume characteristics previously stored in said memory, and multiplies together said fuel volume and said stored fuel density to obtain weight of remaining fuel.

4. The apparatus of claim 2, wherein, when the level of said fuel is lower than the position of said auxiliary fuel level detector, said processor unit stores said fuel density calculated immediately before the fuel level becomes lower than the fuel level detected by the auxiliary fuel level detector, and by use of output values from said fuel level detectors and said internal pressure detector and information stored in said memory, subtracts the pressure value outputted from a third fuel level detector from the pressure value of the other fuel level detector, and calculates an angle of inclination of fuel surface by use of the result of said subtraction, said distance values between said fuel detectors, and said stored fuel density, calculates fuel level by use of said angle of inclination of fuel surface, value obtained by subtracting the pressure value outputted from said internal pressure detector from the pressure value from the other fuel level detector, and said stored fuel density, obtains volume of fuel from said angle of inclination of fuel surface and said fuel level and by use of said information concerning predetermined fuel level, predetermined inclination angle and predetermined volum characteristics previously stored in said memory, and multiplies together said fuel volume and said stored fuel density to obtain weight of remaining fuel.

5. A method of measuring weight of fuel remaining in a fuel tank of an aircraft, said tank having an excess pressure, with an apparatus comprising three or more fuel level detectors comprising three or more absolute pressure measuring transducers of a type outputting a pressure value in a form of a frequency signal, said pressure transducers being immersed in said fuel to detect a fuel level, and said pressure transducers being provided on the bottom of said fuel tank at predetermined distances from each other and in the same plane so as to calculate angle of inclination of fuel surface, fuel level and density while cancelling component of acceleration included in a detected value outputted from each of said pressure transducers;

an auxiliary fuel level detector comprising at least one pressure transducer positioned at a predetermined distance substantially directly above at least one of said fuel level detectors and in said tank;

an internal pressure detector comprising an absolute pressure measuring transducer of a type outputting an internal pressure value in a form of a frequency signal, said internal pressure transducer being disposed within said fuel tank alone at a position which is out of contact with said fuel to measure internal pressure of said fuel tank which is in said excess pressure state as an absolute pressure value, said measured internal pressure being provided to eliminate a detected pressure value of said fuel tank in an excess pressure state which is included in the detected values outputted from said fuel level detectors and said auxiliary fuel level detector; and a processor unit connected to said fuel level detector, said auxiliary fuel level detector and said internal pressure detector, and comprising as memory for storing information concerning predetermined fuel level, predetermined inclination angle of said fuel surface and predetermined volume characteristics matched with shaped of said fuel tank and calculated information required to calculate weight of remaining fuel, a frequency input interface circuit supplied with outputs from said fuel level detectors, said auxiliary fuel level detector and said internal pressure detector, a calculation function circuit for calculating angle of inclination of fuel surface and fuel level, volume of fuel, density of fuel and weight of remaining fuel, and an output interface circuit for outputting the results of calculations performed by said calculation function circuit, wherein said method comprises the steps of supplying to said input interface circuit output signals from said fuel level detectors, said auxiliary fuel level detectors, and said internal pressure detector;

calculating by use of said calculation function circuit angle of inclination of fuel surface and fuel level in forms wherein component of acceleration included in each measured pressure value is cancelled by dividing pressure values outputted from said fuel level detectors by pressure values from said auxiliary fuel level detector, on basis of information supplied to said input interface circuit and information stored in said memory;

obtaining by use of said calculation function circuit volume of fuel from stored information concerning predetermined fuel level, predetermined inclination angle of fuel surface and predetermined volume characteristics;

calculating using said calculation function circuit density of fuel on basis of pressure values outputted from said auxiliary fuel level detector and said fuel level detector positioned opposite thereto, pressure values outputted from two of said fuel level detectors and values relating to said distances between said fuel level detectors;

obtaining by use of said calculation function circuit weight of remaining fuel by multiplying together said fuel volume and said fuel density; and outputting by use of said output interface circuit the results of calculations performed by said calculation function circuit.

* * * * *